US010135636B2

(12) United States Patent
Jiang et al.

(10) Patent No.: US 10,135,636 B2
(45) Date of Patent: Nov. 20, 2018

(54) METHOD FOR GENERATING FORWARDING INFORMATION, CONTROLLER, AND SERVICE FORWARDING ENTITY

(71) Applicant: HUAWEI TECHNOLOGIES CO., LTD., Shenzhen (CN)

(72) Inventors: Yuanlong Jiang, Shenzhen (CN); Lehong Niu, Shenzhen (CN); Hengjun Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/274,144

(22) Filed: Sep. 23, 2016

(65) Prior Publication Data
US 2017/0012799 A1 Jan. 12, 2017

Related U.S. Application Data

(63) Continuation of application No. PCT/CN2015/071747, filed on Jan. 28, 2015.

(30) Foreign Application Priority Data

Mar. 25, 2014 (CN) .......................... 2014 1 0112719

(51) Int. Cl.
H04L 12/64 (2006.01)
H04L 12/24 (2006.01)
(Continued)

(52) U.S. Cl.
CPC .......... *H04L 12/6418* (2013.01); *H04L 41/12* (2013.01); *H04L 45/24* (2013.01);
(Continued)

(58) Field of Classification Search
None
See application file for complete search history.

(56) References Cited

U.S. PATENT DOCUMENTS 6,954,463 B1 * 10/2005 Ma .......................... H04L 45/00
370/392
7,936,780 B1 5/2011 Kompella
(Continued)

FOREIGN PATENT DOCUMENTS

CN 101175033 A 5/2008
CN 102771094 A 11/2012

OTHER PUBLICATIONS

Y. Jiang et al. An Architecture of Service Chaining, draft-jiang-service-chaining-arch-00. Internet Working Group. Jun. 27, 2013. total 11 pages.
(Continued)

Primary Examiner — Eunsook Choi
(74) Attorney, Agent, or Firm — Oblon, McClelland, Maier & Neustadt, L.L.P.

(57) ABSTRACT

The present application discloses a method for generating forwarding information. The method includes: determining, by a controller, a first SFE and a second SFE that are used to forward a service stream, where the first SFE and the second SFE are on a service function chain corresponding to the service stream; generating, by the controller, first forwarding information for the first SFE and generating second forwarding information for the second SFE; and sending, by the controller, the first forwarding information to the first SFE and sending the second forwarding information to the second SFE. According to the method for generating forwarding information, the controller generates forwarding information for the SFE, so that a service chaining technology can be applied to a service environment in which a large quantity of services and a large quantity of service processing function units exist.

16 Claims, 4 Drawing Sheets

(51) Int. Cl.
    *H04L 12/707*    (2013.01)
    *H04L 12/741*    (2013.01)
    *H04L 29/12*     (2006.01)
    *H04L 29/08*     (2006.01)

(52) U.S. Cl.
    CPC ........ *H04L 45/745* (2013.01); *H04L 61/6022* (2013.01); *H04L 67/02* (2013.01)

(56) References Cited

U.S. PATENT DOCUMENTS

| | | | |
|---|---|---|---|
| 2005/0220022 A1* | 10/2005 | DelRegno | H04L 47/10 370/235 |
| 2010/0103837 A1* | 4/2010 | Jungck | H04L 29/12066 370/252 |
| 2011/0149963 A1 | 1/2011 | Hamilton et al. | |
| 2013/0003736 A1 | 1/2013 | Szyszko et al. | |
| 2013/0010788 A1 | 1/2013 | Hamilton et al. | |
| 2013/0272305 A1 | 10/2013 | Lefebvre et al. | |
| 2015/0063359 A1* | 3/2015 | Sella | H04L 45/42 370/397 |
| 2015/0207724 A1* | 7/2015 | Choudhury | H04L 41/12 370/255 |
| 2016/0254998 A1* | 9/2016 | Jokela | H04L 45/308 370/390 |

OTHER PUBLICATIONS

International Search Report dated Apr. 24, 2015 for PCT/CN2015/071747 with English Translation.

\* cited by examiner

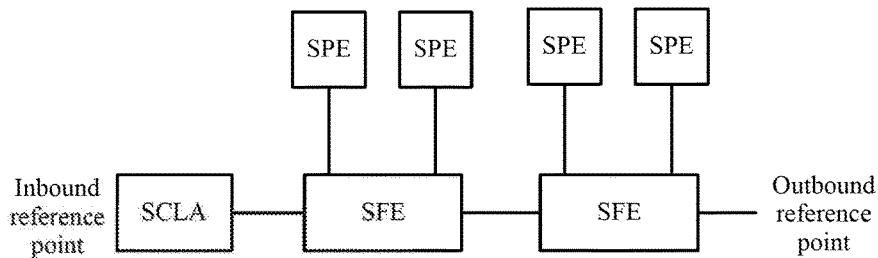

| A controller determines a first SFE and a second SFE that are used to forward a service stream, where the first SFE and the second SFE are on a service function chain corresponding to the service stream | ~ S110 |

| The controller generates first forwarding information for the first SFE, where the first forwarding information is used to enable the first SFE to forward a first part of the service stream to a first service processing entity SPE attached to the first SFE, the first SPE is used to perform service processing on the received first part of the service stream, and the first forwarding information is further used to enable the first SFE to forward a second part of the service stream to the second SFE along the service function chain | ~ S120 |

| The controller generates second forwarding information for the second SFE, where the second forwarding information is used to enable the second SFE to forward the second part of the service stream to a second SPE attached to the second SFE, and the second SPE is used to perform service processing on the received second part of the service stream | ~ S130 |

| The controller sends the first forwarding information to the first SFE | ~ S140 |

| The controller sends the second forwarding information to the second SFE | ~ S150 |

FIG. 2

METHOD FOR GENERATING FORWARDING INFORMATION, CONTROLLER, AND SERVICE FORWARDING ENTITY

CROSS-REFERENCE TO RELATED APPLICATIONS

This application is a continuation of International Application No. PCT/CN2015/071747, filed on Jan. 28, 2015, which claims priority to Chinese Patent Application No. 201410112719.4, filed on Mar. 25, 2014. The disclosures of the aforementioned applications are hereby incorporated by reference in their entireties.

TECHNICAL FIELD

The present application relates to a communications technology, and in particular, to a method for generating forwarding information, a controller, and a service forwarding entity.

BACKGROUND

Currently, load sharing is generally performed based on 5-tuple information. For example, a hash operation is performed on an IP source address, an IP destination address, a protocol number, a source port, and a destination port in a 5-tuple, and a signal stream is exported to different next-hop routing devices according to a result of the hash operation. Generally, such hash is statically preconfigured on a network device, such as a router, and cannot be adjusted according to a specific condition.

As service types of operators increase, a more flexible service chaining technology is put forward. This technology provides a basis for flexible service processing by linking multiple service processing functions. In the service chaining technology, a service classifier (SCLA) classifies a service stream, and then a service forwarding entity (SFE) forwards the service stream to different service processing entities (SPE) for service processing. In the service chaining technology, service load sharing cannot be dynamically adjusted according to usage of a service network resource. Therefore, the service chaining technology can support only a small-size service network and is not applicable to a service environment in which a large quantity of services and a large quantity of service processing function units exist.

SUMMARY

Embodiments of the present application provide a method for generating forwarding information, a controller, and a service forwarding entity, which can implement service load sharing, so that a service chaining technology can be applied to a service environment in which a large quantity of services and a large quantity of service processing function units exist.

According to a first aspect, a method for generating forwarding information is provided, where the method includes: determining, by a controller, a first SFE and a second SFE that are used to forward a service stream, where the first SFE and the second SFE are on a service function chain corresponding to the service stream; generating, by the controller, first forwarding information for the first SFE, where the first forwarding information is used to enable the first SFE to forward a first part of the service stream to a first SPE attached to the first SFE, the first SPE is used to perform service processing on the received first part of the service stream, and the first forwarding information is further used to enable the first SFE to forward a second part of the service stream to the second SFE along the service function chain; generating, by the controller, second forwarding information for the second SFE, where the second forwarding information is used to enable the second SFE to forward the second part of the service stream to a second SPE attached to the second SFE, where the second SPE is used to perform service processing on the received second part of the service stream; sending, by the controller, the first forwarding information to the first SFE; and sending, by the controller, the second forwarding information to the second SFE.

With reference to the first aspect, in a first possible implementation manner of the first aspect, the method further includes: sending, by the controller, stream classification information to a SCLA, where the stream classification information is used to enable the SCLA to classify the service stream into the first part and the second part, add a first substream identifier to the first part of the service stream, and add a second substream identifier to the second part of the service stream, where the first forwarding information is specifically used to enable the first SFE to identify the first part of the service stream according to the first substream identifier and forward the first part of the service stream to the first SPE, and enable the first SFE to identify the second part of the service stream according to the second substream identifier and forward the second part of the service stream to the second SFE; and the second forwarding information is specifically used to enable the second SFE to identify the second part of the service stream according to the second substream identifier and forward the second part of the service stream to the second SPE.

With reference to the first aspect, in a second possible implementation manner of the first aspect, the method further includes: sending, by the controller, stream division information to the first SFE, where the stream division information and the first forwarding information are specifically used to enable the first SFE to forward the first part of the service stream to the first service processing entity SPE attached to the first SFE, and enable the first SFE to forward the second part of the service stream to the second SFE along the service function chain; and the second forwarding information is specifically used to enable the second SFE to use, as the second part, a part that is of the service stream and does not carry identifier information indicating that service processing has been performed, and enable the second SFE to forward the second part of the service stream to the second SPE.

With reference to the first aspect or any implementation manner of the first and the second possible implementation manners of the first aspect, in a third possible implementation manner of the first aspect, the determining a first SFE and a second SFE that are used to forward a service stream includes: according to at least one of a packet transmit-receive quantity of an SFE within a unit time, bandwidth resource usage of an SFE, quality of service (QoS) of an SFE, physical central processing unit (CPU) usage of an SPE, virtual machine (VM) usage of an SPE, physical CPU storage resource usage of an SPE, or virtual storage resource usage of an SPE, where the SFE and the SPE are on the service function chain, determining the first SFE and the second SFE that are used to forward the service stream.

According to a second aspect, a method for forwarding a service stream is provided, where the method includes: receiving, by a first SFE, forwarding information generated by a controller, where the forwarding information is used to enable the first SFE to forward a first part of a service stream to a first SPE attached to the first SFE, and the forwarding information is further used to enable the first SFE to forward a second part of the service stream to a second SFE along a service function chain; receiving, by the first SFE, the service stream; forwarding, by the first SFE according to the forwarding information, the first part of the service stream to the first SPE attached to the first SFE; and forwarding, by the first SFE according to the forwarding information, the second part of the service stream to a second SFE along a service function chain.

With reference to the second aspect, in a first possible implementation manner of the second aspect, the forwarding, by the first SFE according to the forwarding information, the first part of the service stream to the first SPE attached to the first SFE includes: forwarding, by the first SFE according to the forwarding information, a first service substream that is in the service stream and carries a first substream identifier to the first SPE attached to the first SFE, where the first service substream is the first part of the service stream; and the forwarding, by the first SFE according to the forwarding information, the second part of the service stream to the second SFE along the service function chain includes: forwarding, by the first SFE to the second SFE according to the forwarding information, a second service substream that is in the service stream and carries a second substream identifier, where the second service substream is the second part of the service stream.

With reference to the first possible implementation manner of the second aspect, in a second possible implementation manner of the second aspect, the method further includes: receiving, by the first SFE from the first SPE, a first part that is of the service stream and on which service processing is performed; and sending, by the first SFE to the second SFE, the first part that is of the service stream and on which service processing is performed, where the first SFE and the second SFE are on a service function chain corresponding to the service stream.

With reference to the second aspect, in a third possible implementation manner of the second aspect, the method further includes: receiving, by the first SFE, stream division information sent by the controller; the forwarding, by the first SFE according to the forwarding information, the first part of the service stream to the first SPE attached to the first SFE includes: forwarding, by the first SFE according to the forwarding information and the stream division information, the first part of the service stream to the first SPE attached to the first SFE; and the forwarding, by the first SFE according to the forwarding information, the second part of the service stream to the second SFE along the service function chain includes: forwarding, by the first SFE according to the forwarding information and the stream division information, the second part of the service stream to the second SFE along the service function chain.

With reference to the third possible implementation manner of the second aspect, in a fourth possible implementation manner of the second aspect, the method further includes: receiving, by the first SFE from the first SPE, a first pan that is of the service stream and on which service processing is performed, where the first part that is of the service stream and on which service processing is performed carries identifier information used to indicate that service processing has been performed on the first part that is of the service stream and that is received from the first SPE; and sending, by the first SFE to the second SFE, the first part that is of the service stream and on which service processing is performed, where the first SFE and the second SFE are on a service function chain corresponding to the service stream.

According to a third aspect, a controller is provided, where the controller includes: a determining module, configured to determine a first SFE and a second SFE that are used to forward a service stream, where the first SFE and the second SFE are on a service function chain corresponding to the service stream; a first generation module, configured to generate first forwarding information for the first SFE determined by the determining module, where the first forwarding information is used to enable the first SFE to forward a first part of the service stream to a first SPE attached to the first SFE, the first SPE is used to perform service processing on the received first part of the service stream, and the first forwarding information generated by the first generation module is further used to enable the first SFE to forward a second part of the service stream to the second SFE along the service function chain; a second generation module, configured to generate second forwarding information for the second SFE determined by the determining module, where the second forwarding information is used to enable the second SFE to forward the second part of the service stream to a second SPE attached to the second SFE, and the second SPE is used to perform service processing on the received second part of the service stream; a first sending module, configured to send the first forwarding information generated by the first generation module to the first SFE determined by the determining module; and a second sending module, configured to send the second forwarding information generated by the second generation module to the second SFE determined by the determining module.

With reference to the third aspect, in a first possible implementation manner of the third aspect, the controller further includes: a third sending module, configured to send stream classification information to a SCLA, where the stream classification information is used to enable the SCLA to classify the service stream into the first part and the second part, add a first substream identifier to the first part of the service stream, and add a second substream identifier to the second part of the service stream, where the first forwarding information is specifically used to enable the first SFE to identify the first part of the service stream according to the first substream identifier and forward the first part of the service stream to the first SPE, and enable the first SFE to identify the second part of the service stream according to the second substream identifier and forward the second part of the service stream to the second SFE; and the second forwarding information is specifically used to enable the second SFE to identify the second part of the service stream according to the second substream identifier and forward the second part of the service stream to the second SPE.

With reference to the third aspect, in a second possible implementation manner of the third aspect, this controller further includes: a fourth sending module, configured to send stream division information to the first SFE, where the stream division information and the first forwarding information are specifically used to enable the first SFE to forward the first part of the service stream to the first service processing entity SPE attached to the first SFE, and enable the first SFE to forward the second part of the service stream to the second SFE along the service function chain; and the second forwarding information is specifically used to enable the second SFE to use, as the second part, a part that is of the service stream and does not carry identifier information indicating that service processing has been performed, and enable the second SFE to forward the second part of the service stream to the second SPE.

With reference to the third aspect or any implementation manner of the first and the second possible implementation manners of the third aspect, in a third possible implementation manner of the third aspect, the determining module is specifically configured to: according to at least one of a packet transmit-receive quantity of an SFE within a unit time, bandwidth resource usage of an SFE, QoS of an SFE, physical CPU usage of an SPE, VM usage of an SPE, physical CPU storage resource usage of an SPE, or virtual storage resource usage of an SPE, where the SFE and the SPE are on the service function chain, determine the first SFE and the second SFE that are used to forward the service stream.

According to a fourth aspect, a SFE is provided, where the SFE includes: a first receiving module, configured to receive forwarding information generated by a controller, where the forwarding information is used to enable the SFE to forward a first part of a service stream to a first SPE attached to the SFE, and the forwarding information is further used to enable the SFE to forward a second part of the service stream to a second SFE along a service function chain; a second receiving module, configured to receive the service stream; a first forwarding module, configured to forward, according to the forwarding information received by the first receiving module, the first part of the service stream received by the second receiving module to the first SPE attached to the SFE; and a second forwarding module, configured to forward, according to the forwarding information received by the first receiving module, the second part of the service stream received by the second receiving module to a second SFE along a service function chain.

With reference to the fourth aspect, in a first possible implementation manner of the fourth aspect, the first forwarding module is specifically configured to forward, according to the forwarding information received by the first receiving module, a first service substream that is in the service stream received by the second receiving module and carries a first substream identifier to the first SPE attached to the SFE, where the first service substream is the first part of the service stream; and the second forwarding module is specifically configured to forward, to the second SFE according to the forwarding information received by the first receiving module, a second service substream that is in the service stream received by the second receiving module and carries a second substream identifier, where the second service substream is the second part of the service stream.

With reference to the first possible implementation manner of the fourth aspect, in a second possible implementation manner of the fourth aspect, the SFE further includes: a third receiving module, configured to receive, from the first SPE, a first part that is of the service stream and on which service processing is performed; and the second forwarding module is specifically configured to: send, to the second SFE, the first part that is of the service stream and on which service processing is performed, where the SFE and the second SFE are on a service function chain corresponding to the service stream.

With reference to the fourth aspect, in a third possible implementation manner of the fourth aspect, the SFE further includes: a fourth receiving module, configured to receive stream division information sent by the controller; the first forwarding module is specifically configured to: forward, according to the forwarding information and the stream division information, the first part of the service stream to the first SPE attached to the SFE; and the second forwarding module is specifically configured to: forward, according to the forwarding information and the stream division information, the second part of the service stream to the second SFE along the service function chain.

With reference to the third possible implementation manner of the fourth aspect, in a fourth possible implementation manner of the fourth aspect, the SFE further includes: a fifth receiving module, configured to receive, from the first SPE, a first part that is of the service stream and on which service processing is performed, where the first part that is of the service stream and on which service processing is performed carries identifier information used to indicate that service processing has been performed on the first part that is of the service stream and that is received from the first SPE; and the second forwarding module is specifically configured to: send, to the second SFE, the first part that is of the service stream and on which service processing is performed, where the SFE and the second SFE are on a service function chain corresponding to the service stream.

Based on the foregoing technical solutions, according to the method for generating forwarding information, the controller, and the service forwarding entity in the embodiments of the present application, the controller generates forwarding information for the service forwarding entity, so as to comprehensively control a route of a service stream and facilitate implementation of load sharing, so that a service chaining technology can be applied to a service environment in which a large quantity of services and a large quantity of service processing function units exist.

BRIEF DESCRIPTION OF DRAWINGS

To describe the technical solutions in the present application more clearly, the following briefly describes the accompanying drawings required for describing the implementation manners. Apparently, the accompanying drawings in the following description show merely some implementation manners of the present application, and persons of ordinary skill in the art may still derive other drawings from these accompanying drawings without creative efforts.

FIG. 1 is a schematic diagram of an architecture of a service network to which an embodiment of the present application is applied;

FIG. 2 is a schematic flowchart of a method for generating forwarding information according to an embodiment of the present application;

DESCRIPTION OF EMBODIMENTS

Figure 3:
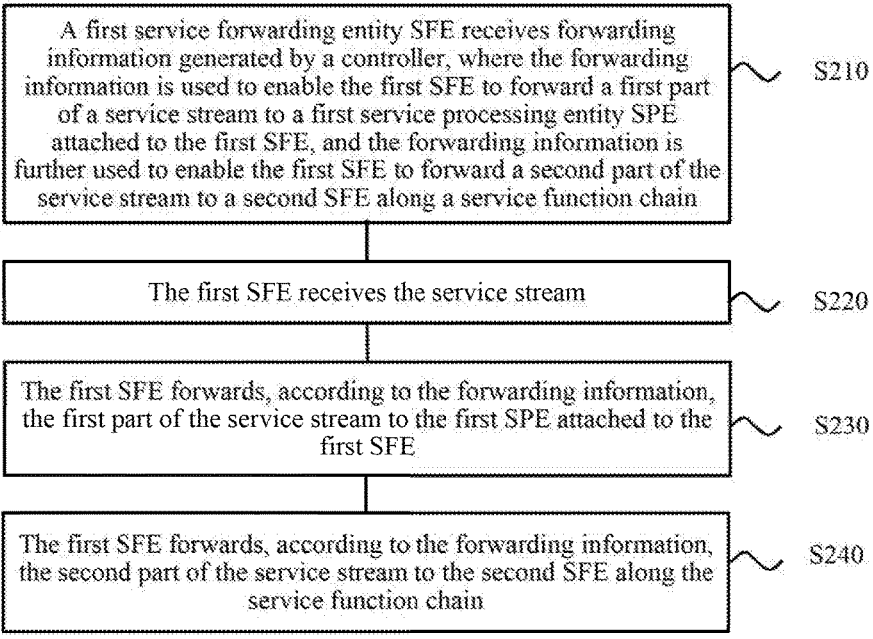
FIG. 3 is a schematic flowchart of a method for forwarding a service stream according to an embodiment of the present application.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

The technical solutions of the present application may be applied to a service chaining technology in a network virtualization environment. The service chaining technology is a technology by using which a service function chain is established and a data packet or a data frame of a service stream is forwarded by using the service function chain. The service stream refers to a data packet or a data frame that comes from a specific user, and/or enters a service network through a specific access port, and/or has a specific service feature (for example, the data packet or the data frame has a specific multi-tuple, such as a media access control (MAC) source address, an Internet protocol (IP) source address, and a transmission control protocol (TCP) destination port, to match headers such as an Ethernet header, an IP header, a TCP header, a hypertext transfer protocol (HTTP) header, or the like). The service function chain refers to one or more service processing functions that are linked together in a specific sequence and that data packets or data frames of one or more service streams need to pass through.

FIG. 1 shows a schematic diagram of an architecture of a service network to which an embodiment of the present application may be applied. As shown in FIG. 1, the architecture of the service network mainly includes an inbound reference point, an SCLA, an SFE, an SPE, and an outbound reference point. The inbound reference point is an inbound point for a data packet or a data frame of a service stream to enter the service network. The SCLA is an entity for classifying incoming data packets or data frames into different service function chains based on a service feature or some service classification information. The SFE is a logical entity for forwarding service data packets or data frames to one or more SPEs on a same service function chain. The SFE may further provide a mapping from the service function chain to a data packet header or a data frame header, and a function of inserting and deleting the data packet header or the data frame header, and forward the data packet or the data frame of the service stream according to service forwarding information, where a service forwarding path formed by means of forwarding by the SFE may not be a shortest path to a destination corresponding to the data packet or frame. The service processing entity SPE is a logical entity that can provide one or more service processing functions (various functions, such as a firewall, deep packet inspection, lawful interception, encryption and decryption, or network address translation) for the data packet or the data frame. Generally, the processing functions are arithmetic-intensive. The SPE may further provide a function of encapsulating or decapsulating the data packet or the data frame. The outbound reference point is an outbound point for the data packet or the data frame of the service stream to leave the service network.

The service network generally includes one SCLA and one or more SFEs, and each SFE is connected to one or more SPEs. It should be noted that, the SCLA, the SFE, and the SPE mentioned in the present application are a logical unit, and may be respectively implemented on different physical devices, or may be implemented on a same physical device in a combination manner (for example, the SCLA and the SFE are combined, the SFE and the SPE are combined, or the SCLA, the SFE, and the SPE are combined together, which are not listed one by one in this embodiment of the present application).

When a packet (data packet or data frame) of a service stream enters the service network through the inbound reference point, the SCLA classifies the service stream according to a service classification table locally generated or preconfigured. Each service stream is classified into a service function chain of the service stream, and a service chain ID is added to the data packet or the data frame of the service stream. After the service stream arrives at an SFE, the SFE obtains a forwarding entry corresponding to service forwarding information by searching for the service forwarding information according to the service chain ID, and then forwards packets of the service stream to different SPEs or sends the packets of the service stream to another SFE. The foregoing service forwarding information may be locally generated or preconfigured by the SFE, or may be delivered by using a service controller. An SPE processes the packets of the service stream, and after processing is completed, the packets of the service stream still return to an SFE corresponding to the SPE. Then the SFE sends the packets of the service stream to a next SFE according to the service forwarding information, . . . , until all SPEs on the service function chain complete processing the service stream, and the packets of the service stream leave the service network through the outbound reference point.

FIG. 2 shows a schematic flowchart of a method 100 for generating forwarding information according to an embodiment of the present application. The method 100 may be executed by a controller. The controller may be an independent controller or network coordinator, or this control function may be provided by a service operation and management platform, such as an operation support system (OSS). In this embodiment of the present application, the controller, an SCLA, an SFE, and an SPE may be independent physical network units, or may belong to a same physical network unit, or even may be implemented by using a virtualized network function in a data center or in a cloud network. As shown in FIG. 2, the method 100 includes:

S110. A controller determines a first SFE and a second SFE that are used to forward a service stream, where the first SFE and the second SFE are on a service function chain corresponding to the service stream.

S120. The controller generates first forwarding information for the first SFE, where the first forwarding information is used to enable the first SFE to forward a first part of the service stream to a first service processing entity SPE attached to the first SFE, the first SPE is used to perform service processing on the received first part of the service stream, and the first forwarding information is further used to enable the first SFE to forward a second part of the service stream to the second SFE along the service function chain.

S130. The controller generates second forwarding information for the second SFE, where the second forwarding information is used to enable the second SFE to forward the second part of the service stream to a second SPE attached to the second SFE, and the second SPE is used to perform service processing on the received second part of the service stream.

S140. The controller sends the first forwarding information to the first SFE.

S150. The controller sends the second forwarding information to the second SFE.

Therefore, in the method for generating forwarding information in this embodiment of the present application, a controller generates forwarding information for a service forwarding entity, so as to comprehensively control a route of a service stream and facilitate implementation of load sharing, so that a service chaining technology can be applied to a service environment in which a large quantity of services and a large quantity of service processing function units exist.

In an embodiment, the controller may acquire service network resource occupation information and determine, according to the acquired service network resource occupation information, the first SFE and the second SFE that are used to forward the service stream. Specifically, according to at least one of a packet transmit-receive quantity of an SFE within a unit time, bandwidth resource usage of an SFE, quality of service QoS of an SFE, physical CPU usage of an SPE, virtual machine VM usage of an SPE, physical CPU storage resource usage of an SPE, or virtual storage resource usage of an SPE, where the SFE and the SPE are on the service function chain, the controller may determine the first SFE and the second SFE that are used to forward the service stream.

Specifically, the controller may replan the service function chain according to usage of each entity on a current service function chain, that is, determine an SFE and an SPE on the service function chain. For example, when port bandwidth resource usage of the first SFE exceeds 80%, and/or a packet loss rate of the first SFE is greater than 20%, and/or virtual machine usage of the first SPE attached to the first SFE exceeds 70%, the controller may add one or more second SFEs to the service function chain, so as to share a load of the first SFE and/or the first SPE.

It should be understood that, in this embodiment of the present application, the controller may acquire the service network resource occupation information in multiple manners, which are not limited in this embodiment of the present application. For example, the controller may periodically (every 1 minute or every 30 seconds) send a polling message to acquire SFE and/or SPE resource occupation information. Alternatively, the SFE and/or the SPE may proactively and periodically send corresponding resource occupation information of the SFE and/or the SPE to the controller. In addition, the controller may further conditionally send a report message by using the SFE and/or the SPE, so as to acquire the service network resource occupation information. Specifically, in an embodiment, when resources occupied by the SFE and/or the SPE exceed a resource threshold, the SFE or the SPE may send a bit sign to the controller, so as to notify the controller that a resource insufficient case occurs on the SFE and/or the SPE. For example, when storage space usage of a central processing unit or a virtual machine of an SPE exceeds 70%, the SPE reports its resource occupation condition to the controller.

After determining the first SFE and the second SFE on the service function chain, the controller generates the first forwarding information for the first SFE, where the first forwarding information is used to enable the first SFE to forward the first part of the service stream to the first service processing entity SPE attached to the first SFE, the first SPE is used to perform service processing on the received first part of the service stream, and the first forwarding information is further used to enable the first SFE to forward the second part of the service stream to the second SFE along the service function chain; the controller further generates the second forwarding information for the second SFE, where the second forwarding information is used to enable the second SFE to forward the second part of the service stream to the second SPE attached to the second SFE, and the second SPE is used to perform service processing on the received second part of the service stream.

Optionally, in an embodiment, the controller may send stream classification information to an SCLA, where the stream classification information is used to enable the service stream classifier to classify the service stream into the first part and the second part, add a first substream identifier to the first part of the service stream, and add a second substream identifier to the second part of the service stream; the first forwarding information generated by the controller for the first SFE is specifically used to enable the first SFE to identify the first part of the service stream according to the first substream identifier and forward the first part of the service stream to the first SPE, and enable the first SFE to identify the second part of the service stream according to the second substream identifier and forward the second part of the service stream to the second SFE; the second forwarding information generated by the controller for the second SFE is specifically used to enable the second SFE to identify the second part of the service stream according to the second substream identifier and forward the second part of the service stream to the second SPE.

Specifically, when multiple service streams arrive at the SCLA, the SCLA may classify the multiple service streams according to information carried by the service streams, such as a service feature or a 5-tuple, classify each service stream into a service function chain of the service stream, and add a service chain ID to a data packet or a data frame of the service stream. Further, the SCLA classifies a service stream into a first part and a second part according to the stream classification information delivered by the controller, adds a first substream identifier to the first part of the service stream, and adds a second substream identifier to the second part of the service stream.

Correspondingly, in the first forwarding information, a service chain ID, a substream identifier, and a service processing result identifier may be used as an index of a forwarding entry, where the service processing result identifier is mainly used to differentiate a part that is of a service stream and on which service processing has been performed from a part that is of the service stream and on which service processing is not performed. For example, an SPE identifier may be used as a service processing result identifier indicating that service processing has been performed, and 0 is used as a default service processing result identifier indicating that service processing is not performed.

In addition, the forwarding entry may be in another form. For example, the service chain ID and the substream identifier may be used as an index entry, so as to differentiate, during forwarding by using inbound port information and the like, whether a service stream has been processed by a specific service unit, which is not limited in this embodiment of the present application.

For example, the index of the forwarding entry is the service chain ID, the substream identifier, and the service processing result identifier. In the index of the forwarding entry, when the service chain ID is a corresponding service chain ID, the substream identifier is the first substream identifier, and the service processing result identifier indicates that service processing is not performed, an outbound interface corresponding to the forwarding entry is an outbound interface connected to the first SPE attached to the first SFE; in the index of the forwarding entry, when the service chain ID is a corresponding service chain ID, the substream identifier is the second substream identifier, and the service processing result identifier indicates that service processing is not performed, an outbound interface corresponding to the forwarding entry is an outbound interface connected to the second SFE used for load sharing. After receiving the service stream and determining that service processing is not performed on the service stream, the first SFE forwards the first part of the service stream to the attached first SPE, and forwards the second part of the service stream to the second SFE.

Optionally, after completing processing the first part of the service stream, the first SPE adds, to the first part on which service processing has been performed, an identifier indicating that service processing has been performed, and sends back a processed first part of the service stream to the first SFE, so as to complete subsequent processing. After receiving, from the first SPE, the first part that is of the service stream and on which service processing has been performed, according to an outbound interface corresponding to a forwarding entry, in an index of which a service chain ID is a corresponding service chain ID, a substream identifier is the first substream identifier, and a service processing result identifier indicates that service processing has been performed, the first SFE sends, to the second SFE, the first part that is of the service stream and on which service processing has been performed, where the first SFE and the second SFE are on the service function chain corresponding to the service stream.

It should be understood that, after the first SFE receives, from the first SPE, the first part that is of the service stream and on which service processing has been performed, the first part may not be sent to the second SFE, but sent to another SFE, or leave the service network through the outbound reference point.

In the second forwarding information, a service chain ID, a substream identifier, and a service processing result identifier may be used as an index of a forwarding entry. In the index of the forwarding entry of the second forwarding information, when the service chain ID is a corresponding service chain ID, the substream identifier is the second substream identifier, and the service processing result identifier indicates that service processing is not performed, an outbound interface corresponding to the forwarding entry is an outbound interface connected to the second SPE attached to the second SFE. After receiving the service stream forwarded by the first SFE and determining that service processing is not performed on the service stream, the second SFE identifies the second part of the service stream according to the second substream identifier, and forwards the second part of the service stream to the second SPE. After completing processing the second part of the service stream, the second SPE adds, to the second part on which service processing has been performed, an identifier indicating that service processing has been performed, and sends back a processed second part of the service stream to the second SFE, so as to complete subsequent processing. After the second SFE receives, from the second SPE, the second part that is of the service stream and on which service processing has been performed, the second part may be sent to another SFE according to the forwarding entry, or leave the service network through the outbound reference point.

It should be understood that, in this embodiment of the present application, a service ID, a substream identifier, and a service processing result identifier in the service stream may be carried by using some fields in a service header, or may be carried in another feasible manner, which is not limited in this embodiment of the present application.

Optionally, in another embodiment, an SCLA does not further divide the service stream into the first part and the second part. In this case, the controller may send stream division information to the first SFE, where the stream division information and the first forwarding information are specifically used to enable the first SFE to forward the first part of the service stream to the first SPE attached to the first SFE, and enable the first SFE to forward the second part of the service stream to the second SFE along the service function chain; and the second forwarding information is specifically used to enable the second SFE to use, as the second part, a part that is of the service stream and does not carry identifier information indicating that service processing has been performed, and enable the second SFE to forward the second part of the service stream to the second SPE.

The first SFE receives the stream division information sent by the controller, where the stream division information may include a policy for classifying the service stream into the first part and the second part. For example, the controller may divide the service stream into the first part and the second part according to processing capabilities of the first SPE attached to the first SFE and the second SPE attached to the second SFE, the controller may evenly divide a first service stream into two parts, or the controller may divide the service stream into the first part and the second part according to respective port capabilities of the first SFE and the second SFE. It should be understood that, the policy may be determined by using an algorithm, such as a fairness algorithm or a funnel algorithm, so that the SPE and the SFE in the service network and network bandwidth are fully used, thereby avoiding a network single-point failure. In addition, the policy may further be a default configuration in the SFE, which is not limited in this embodiment of the present application.

In this embodiment, in the first forwarding information, a service chain ID and a service processing result identifier may be used as an index of a forwarding entry, where the service processing result identifier is mainly used to differentiate a part that is of a service stream and on which service processing has been performed from a part that is of the service stream and on which service processing is not performed.

In addition, the forwarding entry may be in another form. For example, the service chain ID may be used as an index entry, so as to differentiate, during forwarding according to inbound port information and the like, whether the service stream has been processed by a specific service unit, which is not limited in this embodiment of the present application.

For example, the index of the forwarding entry is the service chain ID and the service processing result identifier. In the index of the forwarding entry of the first forwarding information, when the service chain ID is a corresponding service chain ID and the service processing result identifier indicates that service processing is not performed, an outbound interface corresponding to the forwarding entry is a list including an outbound interface connected to the first SPE and an outbound interface connected to the second SFE. After receiving the service stream and determining that service processing is not performed on the service stream, according to the forwarding entry in the first forwarding information and the policy in the stream division information, the first SFE forwards the first part of the service stream to the first SPE attached to the first SFE. After completing service processing on the first part, the first SPE adds, to the first part of the service stream, identifier information indicating that service processing has been performed, and sends back the first part to the first SFE, so as to complete subsequent processing.

Correspondingly, the first SFE receives, from the first SPE, a first part that is of the service stream and on which service processing has been performed, where the first part that is of the service stream and on which service processing has been performed carries identifier information indicating that service processing has been performed on the first part that is of the service stream and that is received from the first SPE. The first SFE sends, to the second SFE according to the forwarding entry in the first forwarding information, the first part that is of the service stream and on which service processing has been performed, where the first SFE and the second SFE are on the service function chain corresponding to the service stream. It should be understood that, after the first SFE receives, from the first SPE, the first part that is of the service stream and on which service processing has been performed, the first part may not be sent to the second SFE, but sent to another SFE according to the forwarding entry in the first forwarding information, or leave the service network through the outbound reference point.

The first SFE further forwards the second part of the service stream to the second SFE along the service function chain according to the forwarding entry in the first forwarding information and the policy in the stream division information. After receiving the service stream forwarded by the first SFE, the second SFE forwards, to the second SPE according to the second forwarding information, a part that is of the service stream and does not carry identifier information indicating that service processing has been performed on the service stream, that is, the second part of the service stream. After completing processing the second part of the service stream, the second SPE adds, to the second part of the service stream, identifier information indicating that service processing has been performed, and sends back a processed second part of the service stream to the second SFE, so as to complete subsequent processing. After the second SFE receives, from the second SPE, the second part that is of the service stream and on which service processing has been performed, the second part may be sent to another SFE, or leave the service network through the outbound reference point.

It should be understood that the second SFE used to share a load of the first SFE may be one SFE, or may be multiple SFEs. When the second SFE includes multiple SFEs, for example, when the second SFE includes an SFE a and an SFE b, the first SFE may send, to the SFE a, all service streams on which the SFE a and the SFE b need to perform forwarding processing, and then the SFE a forwards, to the SFE b, a service stream on which the SFE b needs to perform forwarding processing. In addition, the first SFE may forward, to the SFE a, a service stream on which the SFE a needs to perform forwarding processing, and the first SFE forwards, to the SFE b, a service stream on which the SFE b needs to perform forwarding processing. The foregoing two implementation manners and an implementation manner in combination of the two implementation manners fall within the protection scope of the present application, and details are not described herein for brevity.

Therefore, in the method for generating forwarding information in this embodiment of the present application, a controller generates forwarding information for a service forwarding entity, so as to comprehensively control a route of a service stream and implement load sharing, so that a service chaining technology can be applied to a service environment in which a large quantity of services and a large quantity of service processing function units exist.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

FIG. 3 shows a schematic flowchart of a method 200 for forwarding a service stream according to an embodiment of the present application. The method 200 may be executed by a service forwarding entity SFE. As shown in FIG. 3, the method 200 includes:

S210. A first service forwarding entity SFE receives forwarding information generated by a controller, where the forwarding information is used to enable the first SFE to forward a first part of a service stream to a first service processing entity SPE attached to the first SFE, and the forwarding information is further used to enable the first SFE to forward a second part of the service stream to a second SFE along a service function chain.

S220. The first SFE receives the service stream.

S230. The first SFE forwards, according to the forwarding information, the first part of the service stream to the first SPE attached to the first SFE.

S240. The first SFE forwards, according to the forwarding information, the second part of the service stream to the second SFE along the service function chain.

Therefore, in the method for forwarding a service stream in this embodiment of the present application, an SFE forwards a service stream according to forwarding information generated by a controller, which may implement load sharing, so that a service chaining technology can be applied to a service environment in which a large quantity of services and a large quantity of service processing function units exist.

Optionally, in an embodiment, an SCLA may classify the service stream into the first part and the second part, add a first substream identifier to the first part, and add a second substream identifier to the second part. Correspondingly, that the first SFE forwards, according to the forwarding information, the first part of the service stream to the first SPE attached to the first SFE includes:

the first SFE forwards, according to the forwarding information, a first service substream that is in the service stream and carries the first substream identifier to the first SPE attached to the first SFE, where the first service substream is the first part of the service stream; and that the first SFE forwards, according to the forwarding information, the second part of the service stream to the second SFE along the service function chain includes:

the first SFE forwards, to the second SFE according to the forwarding information, a second service substream that is in the service stream and carries the second substream identifier, where the second service substream is the second part of the service stream.

Optionally, after completing processing the first part of the service stream, the first SPE sends back a processed first part of the service stream to the first SFE, so as to complete subsequent processing.

Correspondingly, the first SFE receives, from the first SPE, the first part that is of the service stream and on which service processing is performed; and the first SFE sends, to the second SFE, the first part that is of the service stream and on which service processing is performed, where the first SFE and the second SFE are on a service function chain corresponding to the service stream.

Optionally, in another embodiment, an SCLA does not divide the service stream into the first part and the second part. In this case, the method 200 further includes:

the first SFE receives stream division information sent by the controller;

that the first SFE forwards, according to the forwarding information, the first part of the service stream to the first SPE attached to the first SFE includes:

the first SFE forwards, according to the forwarding information and the stream division information, the first part of the service stream to the first SPE attached to the first SFE; and that the first SFE forwards, according to the forwarding information, the second part of the service stream to the second SFE along the service function chain includes:

the first SFE forwards, according to the forwarding information and the stream division information, the second part of the service stream to the second SFE along the service function chain.

Optionally, after completing processing the first part of the service stream, the first SPE sends back a processed first part of the service stream to the first SFE, so as to complete subsequent processing.

Correspondingly, the first SFE receives, from the first SPE, the first part that is of the service stream and on which service processing is performed, where the first part that is of the service stream and on which service processing is performed carries identifier information used to indicate that service processing has been performed on the first pan that is of the service stream and that is received from the first SPE; and the first SFE sends, to the second SFE, the first part that is of the service stream and on which service processing is performed, where the first SFE and the second SFE are on a service function chain corresponding to the service stream.

Therefore, in the method for forwarding a service stream in this embodiment of the present application, an SFE forwards a service stream according to forwarding information generated by a controller, which may implement load sharing, so that a service chaining technology can be applied to a service environment in which a large quantity of services and a large quantity of service processing function units exist.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

Figure 4:
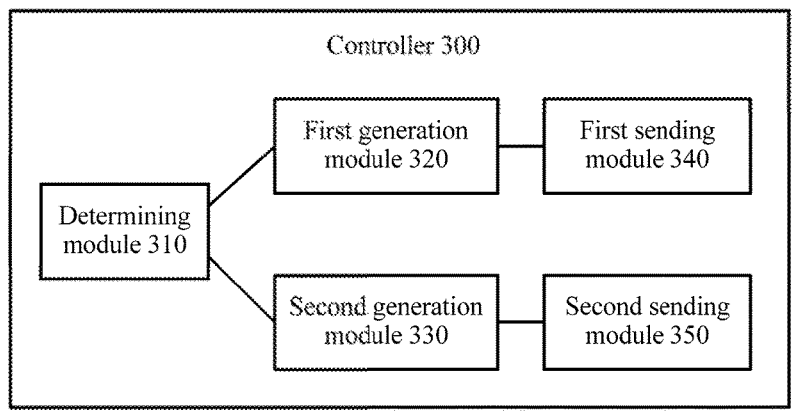
FIG. 4 is a schematic block diagram of a controller according to an embodiment of the present application.
Figure 5:
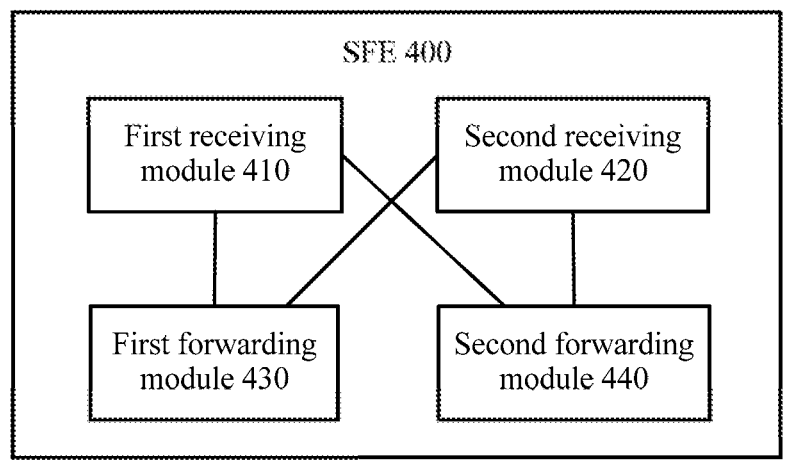
FIG. 5 is a schematic block diagram of a service forwarding entity according to an embodiment of the present application.

With reference to FIG. 2 and FIG. 3, the foregoing describes in detail the method for generating forwarding information and the method for forwarding a service stream according to the embodiments of the present application. With reference to FIG. 4 and FIG. 5, the following describes a controller and an SFE according to the embodiments of the present application.

FIG. 4 shows a schematic block diagram of a controller 300 according to an embodiment of the present application. As shown in FIG. 4, the controller 300 includes:

a determining module 310, configured to determine a first SFE and a second SFE that are used to forward a service stream, where the first SFE and the second SFE are on a service function chain corresponding to the service stream;

a first generation module 320, configured to generate first forwarding information for the first SFE determined by the determining module 310, where the first forwarding information is used to enable the first SFE to forward a first part of the service stream to a first service processing entity SPE attached to the first SFE, the first SPE is used to perform service processing on the received first part of the service stream, and the first forwarding information generated by the first generation module 320 is further used to enable the first SFE to forward a second part of the service stream to the second SFE along the service function chain;

a second generation module 330, configured to generate second forwarding information for the second SFE determined by the determining module 310, where the second forwarding information is used to enable the second SFE to forward the second part of the service stream to a second SPE attached to the second SFE, and the second SPE is used to perform service processing on the received second part of the service stream;

a first sending module 340, configured to send the first forwarding information generated by the first generation module 320 to the first SFE determined by the determining module 310; and a second sending module 350, configured to send the second forwarding information generated by the second generation module 330 to the second SFE determined by the determining module 310.

Therefore, the controller in this embodiment of the present application generates forwarding information for an SFE, so as to comprehensively control a route of a service stream and facilitate implementation of load sharing, so that a service chaining technology can be applied to a service environment in which a large quantity of services and a large quantity of service processing function units exist.

Optionally, in an embodiment, the controller 300 further includes:

a third sending module, configured to send stream classification information to an SCLA, where the stream classification information is used to enable the service stream classifier to classify the service stream into the first part and the second part, add a first substream identifier to the first part of the service stream, and add a second substream identifier to the second part of the service stream, where the first forwarding information is specifically used to enable the first SFE to identify the first part of the service stream according to the first substream identifier and forward the first part of the service stream to the first SPE, and enable the first SFE to identify the second part of the service stream according to the second substream identifier and forward the second part of the service stream to the second SFE; and the second forwarding information is specifically used to enable the second SFE to identify the second part of the service stream according to the second substream identifier and forward the second part of the service stream to the second SPE.

Optionally, in an embodiment, the controller 300 further includes:

a fourth sending module, configured to send stream division information to the first SFE, where the stream division information and the first forwarding information are specifically used to:

enable the first SFE to forward the first part of the service stream to the first service processing entity SPE attached to the first SFE, and enable the first SFE to forward the second part of the service stream to the second SFE along the service function chain; and the second forwarding information is specifically used to:

enable the second SFE to use, as the second part, a part that is of the service stream and does not carry identifier information indicating that service processing has been performed; and enable the second SFE to forward the second part of the service stream to the second SPE.

Optionally, in an embodiment, the determining module 310 is specifically configured to: according to at least one of a packet transmit-receive quantity of an SFE within a unit time, bandwidth resource usage of an SFE, quality of service QoS of an SFE, physical CPU usage of an SPE, virtual machine VM usage of an SPE, physical CPU storage resource usage of an SPE, or virtual storage resource usage of an SPE, where the SFE and the SPE are on the service function chain, determine the first SFE and the second SFE that are used to forward the service stream.

It should be understood that the controller according to this embodiment of the present application may be corresponding to an entity for executing the method in the embodiment of the present application, and the foregoing and other operations and/or functions of the modules in the controller 300 are intended to implement corresponding procedures of the methods in FIG. 2 and FIG. 3, and the corresponding procedures are not described herein for brevity.

Therefore, the controller in this embodiment of the present application generates forwarding information for an SFE, so as to comprehensively control a route of a service stream and facilitate implementation of load sharing, so that a service chaining technology can be applied to a service environment in which a large quantity of services and a large quantity of service processing function units exist.

FIG. 5 shows a schematic block diagram of an SFE 400 according to an embodiment of the present application. As shown in FIG. 5, the SFE 400 includes:

a first receiving module 410, configured to receive forwarding information generated by a controller, where the forwarding information is used to enable the SFE to forward a first part of a service stream to a first service processing entity SPE attached to the SFE, and the forwarding information is further used to enable the SFE to forward a second part of the service stream to a second SFE along a service function chain;

a second receiving module 420, configured to receive the service stream;

a first forwarding module 430, configured to forward, according to the forwarding information received by the first receiving module 410, the first part of the service stream received by the second receiving module 420 to the first SPE attached to the SFE; and a second forwarding module 440, configured to forward, according to the forwarding information received by the first receiving module 410, the second part of the service stream received by the second receiving module 420 to the second SFE along the service function chain.

Therefore, the SFE in this embodiment of the present application forwards a service stream according to forwarding information generated by a controller, which may implement load sharing, so that a service chaining technology can be applied to a service environment in which a large quantity of services and a large quantity of service processing function units exist.

Optionally, in an embodiment, the first forwarding module 430 is specifically configured to:

forward, according to the forwarding information received by the first receiving module 410, a first service substream that is in the service stream received by the second receiving module 420 and carries a first substream identifier to the first SPE attached to the SFE, where the first service substream is the first part of the service stream; and the second forwarding module 440 is specifically configured to:

forward, to the second SFE according to the forwarding information received by the first receiving module 410, a second service substream that is in the service stream received by the second receiving module 420 and carries a second substream identifier, where the second service substream is the second part of the service stream.

Optionally, in an embodiment, the SFE 400 further includes:

a third receiving module, configured to receive, from the first SPE, a first part that is of the service stream and on which service processing is performed; and the second forwarding module 440 is specifically configured to:

send, to the second SFE, the first part that is of the service stream and on which service processing is performed, where the SFE 400 and the second SFE are on a service function chain corresponding to the service stream.

Optionally, in an embodiment, the SFE 400 further includes:

a fourth receiving module, configured to receive stream division information sent by the controller;

the first forwarding module 430 is specifically configured to:

forward, according to the forwarding information and the stream division information, the first part of the service stream to the first SPE attached to the SFE 400; and the second forwarding module 440 is specifically configured to:

forward, according to the forwarding information and the stream division information, the second part of the service stream to the second SFE along the service function chain.

Optionally, in an embodiment, the SFE 400 further includes:

a fifth receiving module, configured to receive, from the first SPE, a first part that is of the service stream and on which service processing is performed, where the first part that is of the service stream and on which service processing is performed carries identifier information used to indicate that service processing has been performed on the first part that is of the service stream and that is received from the first SPE; and the second forwarding module 440 is specifically configured to:

send, to the second SFE, the first part that is of the service stream and on which service processing is performed, where the SFE and the second SFE are on a service function chain corresponding to the service stream.

It should be understood that the SFE 400 according to this embodiment of the present application may be corresponding to an entity for executing the method in the embodiment of the present application, and the foregoing and other operations and/or functions of the modules in the SFE 400 are intended to implement corresponding procedures of the methods in FIG. 2 and FIG. 3, and the corresponding procedures are not described herein for brevity.

Therefore, the SFE in this embodiment of the present application forwards a service stream according to forwarding information generated by a controller, which may implement load sharing, so that a service chaining technology can be applied to a service environment in which a large quantity of services and a large quantity of service processing function units exist.

Figure 6:
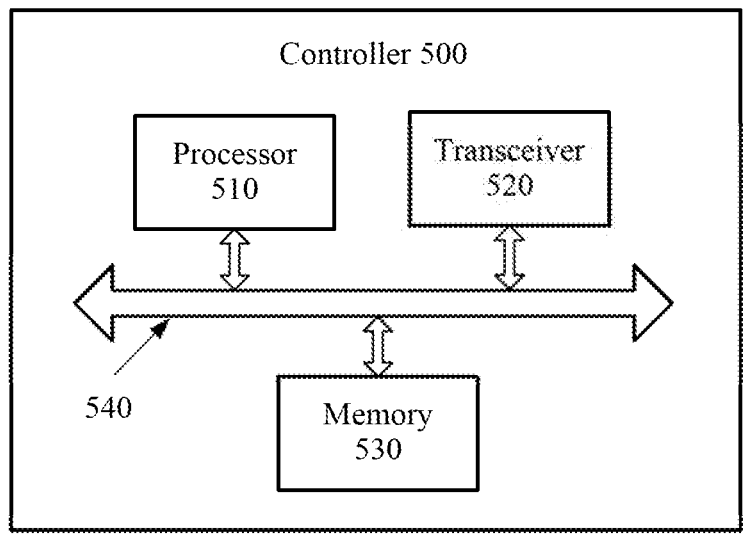
FIG. 6 is a schematic block diagram of a controller according to another embodiment of the present application.

FIG. 6 shows a schematic block diagram of a controller 500 according to another embodiment of the present application. As shown in FIG. 6, the controller 500 includes: a processor 510, a transceiver 520, a memory 530, and a bus 540, where the processor 510, the transceiver 520, and the memory 530 are connected by using the bus system 540, the memory 530 is configured to store an instruction, and the processor 510 is configured to execute the instruction stored by the memory 530. The processor 510 is configured to:

determine a first SFE and a second SFE that are used to forward a service stream, where the first SFE and the second SFE are on a service function chain corresponding to the service stream;

generate first forwarding information for the first SFE, where the first forwarding information is used to enable the first SFE to forward a first part of the service stream to a first service processing entity SPE attached to the first SFE, the first SPE is used to perform service processing on the received first part of the service stream, and the first forwarding information is further used to enable the first SFE to forward a second part of the service stream to the second SFE along the service function chain; and generate second forwarding information for the second SFE, where the second forwarding information is used to enable the second SFE to forward the second part of the service stream to a second SPE attached to the second SFE, and the second SPE is used to perform service processing on the received second part of the service stream.

The transceiver 520 is configured to:

send the first forwarding information to the first SFE; and send the second forwarding information to the second SFE.

Therefore, the controller in this embodiment of the present application generates forwarding information for an SFE, so as to comprehensively control a route of a service stream and facilitate implementation of load sharing, so that a service chaining technology can be applied to a service environment in which a large quantity of services and a large quantity of service processing function units exist.

It should be understood that in this embodiment of the present application, the processor 510 may be a central processing unit (CPU), or the processor 510 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

The memory 530 may include a read-only memory and a random access memory, and provide an instruction and data to the processor 510. A part of the memory 530 may further include a non-volatile random access memory. For example, the memory 530 may further store information about a device type.

In addition to a data bus, the bus system 540 may include a power bus, a control bus, a status signal bus, and the like. However, for clarity of description, various buses are marked as the bus system 540 in the figure.

In an implementation process, the steps in the foregoing method may be completed by using an integrated logic circuit of hardware in the processor 510 or an instruction in a form of software. The steps of the method disclosed with reference to the embodiments of the present application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 530. The processor 510 reads information in the memory 530, and completes the steps of the foregoing method in combination with hardware of the processor 510. To avoid repetition, details are not described herein again.

Optionally, in an embodiment, the transceiver 520 is further configured to:

send stream classification information to a service stream classifier, where the stream classification information is used to enable the service stream classifier to classify the service stream into the first part and the second part, add a first substream identifier to the first part of the service stream, and add a second substream identifier to the second part of the service stream, where the first forwarding information is specifically used to enable the first SFE to identify the first part of the service stream according to the first substream identifier and forward the first part of the service stream to the first SPE, and enable the first SFE to identify the second part of the service stream according to the second substream identifier and forward the second part of the service stream to the second SFE; and the second forwarding information is specifically used to enable the second SFE to identify the second part of the service stream according to the second substream identifier and forward the second part of the service stream to the second SPE.

Optionally, in an embodiment, the transceiver 520 is further configured to:

send stream division information to the first SFE, where the stream division information and the first forwarding information are specifically used to:

enable the first SFE to forward the first part of the service stream to the first service processing entity SPE attached to the first SFE, and enable the first SFE to forward the second part of the service stream to the second SFE along the service function chain; and the second forwarding information is specifically used to:

enable the second SFE to use, as the second part, a part that is of the service stream and does not carry identifier information indicating that service processing has been performed; and enable the second SFE to forward the second part of the service stream to the second SPE.

Optionally, in an embodiment, that the processor 510 determines a first SFE and a second SFE that are used to forward a service stream includes: according to at least one of a packet transmit-receive quantity of an SFE within a unit time, bandwidth resource usage of an SFE, quality of service QoS of an SFE, physical CPU usage of an SPE, virtual machine VM usage of an SPE, physical CPU storage resource usage of an SPE, or virtual storage resource usage of an SPE, where the SFE and the SPE are on the service function chain, determining the first SFE and the second SFE that are used to forward the service stream.

It should be understood that the controller 500 according to this embodiment of the present application may be corresponding to an entity for executing the method in the embodiment of the present application, and may also be corresponding to the controller 300 according to the embodiment of the present application, and the foregoing and other operations and/or functions of the modules in the controller 500 are intended to implement corresponding procedures of the methods in FIG. 2 and FIG. 3, and the corresponding procedures are not described herein for brevity.

Therefore, the controller in this embodiment of the present application generates forwarding information for an SFE, so as to comprehensively control a route of a service stream and facilitate implementation of load sharing, so that a service chaining technology can be applied to a service environment in which a large quantity of services and a large quantity of service processing function units exist.

Figure 7:
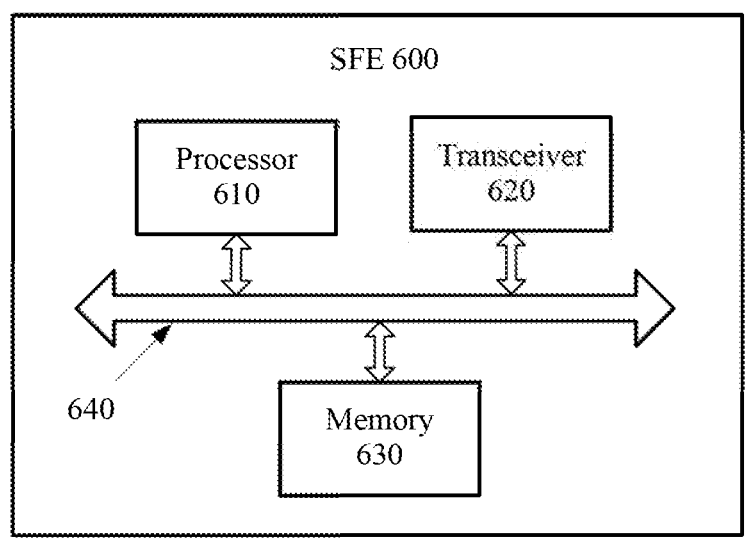
FIG. 7 is a schematic block diagram of a service forwarding entity according to another embodiment of the present application.

FIG. 7 shows a schematic block diagram of an SFE 600 according to another embodiment of the present application. As shown in FIG. 7, the SFE 600 includes: a processor 610, a transceiver 620, a memory 630, and a bus 640, where the processor 610, the transceiver 620, and the memory 630 are connected by using the bus system 640, the memory 630 is configured to store an instruction, and the processor 610 is configured to execute the instruction stored by the memory 630. The transceiver 620 is configured to:

receive forwarding information generated by a controller, where the forwarding information is used to enable the first SFE to forward a first part of a service stream to a first service processing entity SPE attached to the first SFE, and the forwarding information is further used to enable the first SFE to forward a second part of the service stream to a second SFE along a service function chain;

receive the service stream;

forward, according to the forwarding information, the first part of the service stream to the first SPE attached to the SFE; and forward, according to the forwarding information, the second part of the service stream to the second SFE along the service function chain.

Therefore, the SFE in this embodiment of the present application forwards a service stream according to forwarding information generated by a controller, which may implement load sharing, so that a service chaining technology can be applied to a service environment in which a large quantity of services and a large quantity of service processing function units exist.

It should be understood that in this embodiment of the present application, the processor 610 may be a central processing unit (CPU), or the processor 610 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

The memory 630 may include a read-only memory and a random access memory, and provide an instruction and data to the processor 610. A part of the memory 630 may further include a non-volatile random access memory. For example, the memory 630 may further store information about a device type.

In addition to a data bus, the bus system 640 may include a power bus, a control bus, a status signal bus, and the like. However, for clarity of description, various buses are marked as the bus system 640 in the figure.

In an implementation process, the steps in the foregoing method may be completed by using an integrated logic circuit of hardware in the processor 610 or an instruction in a form of software. The steps of the method disclosed with reference to the embodiments of the present application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 630. The processor 610 reads information in the memory 630, and completes the steps of the foregoing method in combination with hardware of the processor 610. To avoid repetition, details are not described herein again.

Optionally, in an embodiment, the transceiver 620 is specifically configured to:

forward, according to the forwarding information, a first service substream that is in the service stream and carries a first substream identifier to the first SPE attached to the first SFE, where the first service substream is the first part of the service stream; and forward, to the second SFE according to the forwarding information, a second service substream that is in the service stream and carries a second substream identifier, where the second service substream is the second part of the service stream.

Optionally, in an embodiment, the transceiver 620 is further configured to:

receive, from the first SPE, a first part that is of the service stream and on which service processing is performed; and send, to the second SFE, the first part that is of the service stream and on which service processing is performed, where the first SFE and the second SFE are on a service function chain corresponding to the service stream.

Optionally, in an embodiment, the transceiver 620 is further configured to:

receive stream division information sent by the controller;

forward, according to the forwarding information and the stream division information, the first part of the service stream to the first SPE attached to the first SFE; and forward, according to the forwarding information and the stream division information, the second part of the service stream to the second SFE along the service function chain.

Optionally, in an embodiment, the transceiver 620 is further configured to:

receive, from the first SPE, a first part that is of the service stream and on which service processing is performed, where the first part that is of the service stream and on which service processing is performed carries identifier information used to indicate that service processing has been performed on the first part that is of the service stream and that is received from the first SPE; and send, to the second SFE, the first part that is of the service stream and on which service processing is performed, where the first SFE and the second SFE are on a service function chain corresponding to the service stream.

It should be understood that the SFE 600 according to this embodiment of the present application may be corresponding to an entity for executing the method in the embodiment of the present application, and may also be corresponding to the SFE 400 according to the embodiment of the present application, and the foregoing and other operations and/or functions of the modules in the SFE 600 are intended to implement corresponding procedures of the methods in FIG. 2 and FIG. 3, and the corresponding procedures are not described herein for brevity.

Therefore, the SFE in this embodiment of the present application forwards a service stream according to forwarding information generated by a controller, which may implement load sharing, so that a service chaining technology can be applied to a service environment in which a large quantity of services and a large quantity of service processing function units exist.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present application.

What is claimed is:

1. A method for generating forwarding information, comprising:
    determining, by a controller, a first service forwarding entity (SFE) and a second SFE, wherein the first SFE and the second SFE are on a service function chain corresponding to a service stream;
    generating, by the controller, first forwarding information for the first SFE, wherein the first forwarding information enables the first SFE to forward a first part of the service stream to a first service processing entity (SPE) attached to the first SFE, and enables the first SFE to forward a second part of the service stream to the second SFE along the service function chain;
    generating, by the controller, second forwarding information for the second SFE, wherein the second forwarding information enables the second SFE to forward the second part of the service stream to a second SPE attached to the second SFE;
    sending, by the controller, the first forwarding information to the first SFE; and
    sending, by the controller, the second forwarding information to the second SFE.

2. The method according to claim 1, wherein the method further comprises:
    sending, by the controller, stream classification information to a service classifier (SCLA),
    the stream classification information enables the SCLA to classify the service stream into the first part and the second part, add a first substream identifier to the first part of the service stream, and add a second substream identifier to the second part of the service stream,
    the first forwarding information enables the first SFE to identify the first part of the service stream according to the first substream identifier and forward the first part of the service stream to the first SPE, and enables the first SFE to identify the second part of the service stream according to the second substream identifier and forward the second part of the service stream to the second SFE, and
    the second forwarding information enables the second SFE to identify the second part of the service stream according to the second substream identifier and forward the second part of the service stream to the second SPE.

3. The method according to claim 1, wherein the method further comprises:
    sending, by the controller, stream division information to the first SFE,
    the stream division information and the first forwarding information
        enable the first SFE to forward the first part of the service stream to the first service processing entity SPE attached to the first SFE, and enable the first SFE to forward the second part of the service stream to the second SFE along the service function chain, and the second forwarding information
enables the second SFE to use, as the second part, a portion of the service stream that does not carry identifier information indicating that service processing has been performed, and
enables the second SFE to forward the second part of the service stream to the second SPE.

4. A method for forwarding a service stream, comprising:
receiving, by a first service forwarding entity (SFE), forwarding information generated by a controller, wherein the forwarding information enables the first SFE to forward a first part of a service stream to a first service processing entity (SPE) attached to the first SFE, and the forwarding information enables the first SFE to forward a second part of the service stream to a second SFE along a service function chain;
receiving, by the first SFE, the service stream;
forwarding, by the first SFE according to the forwarding information, the first part of the service stream to the first SPE attached to the first SFE; and
forwarding, by the first SFE according to the forwarding information, the second part of the service stream to the second SFE along the service function chain.

5. The method according to claim 4, wherein
the forwarding, by the first SFE according to the forwarding information, the first part of the service stream to the first SPE attached to the first SFE comprises:
forwarding, by the first SFE according to the forwarding information, a first service substream that is in the service stream and carries a first substream identifier to the first SPE attached to the first SFE, wherein the first service substream is the first part of the service stream; and
the forwarding, by the first SFE according to the forwarding information, the second part of the service stream to the second SFE along the service function chain comprises:
forwarding, by the first SFE to the second SFE according to the forwarding information, a second service substream that is in the service stream and carries a second substream identifier, wherein the second service substream is the second part of the service stream.

6. The method according to claim 5, wherein the method further comprises:
receiving, by the first SFE from the first SPE, the first part of the service stream and on which service processing is performed; and
sending, by the first SFE to the second SFE, the first part of the service stream and on which service processing is performed, wherein the first SFE and the second SFE are on the service function chain corresponding to the service stream.

7. The method according to claim 4, wherein
the method further comprises:
receiving, by the first SFE, stream division information sent by the controller;
the forwarding, by the first SFE according to the forwarding information, the first part of the service stream to the first SPE attached to the first SFE comprises:
forwarding, by the first SFE according to the forwarding information and the stream division information, the first part of the service stream to the first SPE attached to the first SFE; and
the forwarding, by the first SFE according to the forwarding information, the second part of the service stream to the second SFE along the service function chain comprises:
forwarding, by the first SFE according to the forwarding information and the stream division information, the second part of the service stream to the second SFE along the service function chain.

8. The method according to claim 7, wherein the method further comprises:
receiving, by the first SFE from the first SPE, the first part of the service stream and on which service processing is performed, wherein the first part of the service stream and on which service processing is performed carries identifier information used to indicate that service processing has been performed on the first part of the service stream and that is received from the first SPE; and
sending, by the first SFE to the second SFE, the first part of the service stream and on which service processing is performed, wherein the first SFE and the second SFE are on a service function chain corresponding to the service stream.

9. A controller, comprising:
a memory storing instructions; and
a processor coupled to the memory to execute the instructions to:
determine a first service forwarding entity (SFE) and a second SFE, wherein the first SFE and the second SFE are on a service function chain corresponding to a service stream;
generate first forwarding information for the first SFE, wherein the first forwarding information enables the first SFE to forward a first part of the service stream to a first service processing entity (SPE) attached to the first SFE, and enables the first SFE to forward a second part of the service stream to the second SFE along the service function chain;
generate second forwarding information for the second SFE, wherein the second forwarding information enables the second SFE to forward the second part of the service stream to a second SPE attached to the second SFE; and
a transceiver, configured to:
send the first forwarding information to the first SFE; and
send the second forwarding information to the second SFE.

10. The controller according to claim 9, wherein
the transceiver is further configured to send stream classification information to a service classifier (SCLA),
the stream classification information enables the SCLA to classify the service stream into the first part and the second part, add a first substream identifier to the first part of the service stream, and add a second substream identifier to the second part of the service stream,
the first forwarding information enables the first SFE to identify the first part of the service stream according to the first substream identifier and forward the first part of the service stream to the first SPE, and enable the first SFE to identify the second part of the service stream according to the second substream identifier and forward the second part of the service stream to the second SFE, and the second forwarding information enables the second SFE to identify the second part of the service stream according to the second substream identifier and forward the second part of the service stream to the second SPE.

11. The controller according to claim 9, wherein
the transceiver is configured to send stream division information to the first SFE,
the stream division information and the first forwarding information
enable the first SFE to forward the first part of the service stream to the first service processing entity SPE attached to the first SFE, and enable the first SFE to forward the second part of the service stream to the second SFE along the service function chain, and
the second forwarding information
enables the second SFE to use, as the second part, a portion of the service stream and does not carry identifier information indicating that service processing has been performed, and
enable the second SFE to forward the second part of the service stream to the second SPE.

12. A service forwarding entity (SFE), comprising a transceiver, wherein the transceiver is configured to:
receive forwarding information generated by a controller, wherein the forwarding information enables the SFE to forward a first part of a service stream to a first service processing entity (SPE) attached to the SFE, and enables the SFE to forward a second part of the service stream to the second SFE along a service function chain;
receive the service stream;
forward, according to the forwarding information received by the transceiver, the first part of the service stream received by the transceiver to the first SPE attached to the SFE; and
forward, according to the forwarding information received by the transceiver, the second part of the service stream received by the transceiver to a second SFE along the service function chain.

13. The SFE according to claim 12, wherein the transceiver is configured to:
forward, according to the forwarding information received by the transceiver, a first service substream that is in the service stream received by the transceiver and carries a first substream identifier to the first SPE attached to the SFE, wherein the first service substream is the first part of the service stream; and
forward, to the second SFE according to the forwarding information received by the transceiver, a second service substream that is in the service stream received by the transceiver and carries a second substream identifier, wherein the second service substream is the second part of the service stream.

14. The SFE according to claim 13, wherein the transceiver is further configured to:
receive, from the first SPE, the first part of the service stream and on which service processing is performed; and
send, to the second SFE, the first part of the service stream and on which service processing is performed, wherein the SFE and the second SFE are on the service function chain corresponding to the service stream.

15. The SFE according to claim 12, wherein the transceiver is further configured to:
receive stream division information sent by the controller;
forward, according to the forwarding information and the stream division information, the first part of the service stream to the first SPE attached to the SFE; and
forward, according to the forwarding information and the stream division information, the second part of the service stream to the second SFE along the service function chain.

16. The SFE according to claim 15, wherein the transceiver is further configured to:
receive, from the first SPE, the first part of the service stream and on which service processing is performed, wherein the first part of the service stream and on which service processing is performed carries identifier information used to indicate that service processing has been performed on the first part of the service stream and that is received from the first SPE; and
send, to the second SFE, the first part of the service stream and on which service processing is performed, wherein the SFE and the second SFE are on the service function chain corresponding to the service stream.

* * * * *

UNITED STATES PATENT AND TRADEMARK OFFICE
CERTIFICATE OF CORRECTION

PATENT NO. : 10,135,636 B2
APPLICATION NO. : 15/274144
DATED : November 20, 2018
INVENTOR(S) : Yuanlong Jiang et al.

Page 1 of 1

It is certified that error appears in the above-identified patent and that said Letters Patent is hereby corrected as shown below:

In the Specification

In Column 3, Line 59, delete "pan" and insert -- part --; and

In Column 24, Line 12, delete "thereof" and insert -- thereof, --.

Signed and Sealed this
Twenty-first Day of April, 2020

Andrei Iancu
*Director of the United States Patent and Trademark Office*